(12) United States Patent
Kaneko

(10) Patent No.: US 7,636,812 B2
(45) Date of Patent: Dec. 22, 2009

(54) CACHE MEMORY CONTROL METHOD AND CACHE MEMORY CONTROL DEVICE

(75) Inventor: Keisuke Kaneko, Osaka (JP)

(73) Assignee: Panasonic Corporation, Osaka (JP)

( * ) Notice: Subject to any disclaimer, the term of this patent is extended or adjusted under 35 U.S.C. 154(b) by 410 days.

(21) Appl. No.: 11/720,751

(22) PCT Filed: Mar. 22, 2006

(86) PCT No.: PCT/JP2006/305676

§ 371 (c)(1),
(2), (4) Date: Jun. 1, 2007

(87) PCT Pub. No.: WO2006/101113

PCT Pub. Date: Sep. 28, 2006

(65) Prior Publication Data

US 2009/0235028 A1    Sep. 17, 2009

(30) Foreign Application Priority Data

Mar. 22, 2005 (JP) ............................. 2005-081544

(51) Int. Cl.
*G06F 13/14* (2006.01)
(52) U.S. Cl. .................. 711/128; 711/119; 711/133; 711/144
(58) Field of Classification Search ............. 711/128, 711/144
See application file for complete search history.

(56) References Cited

U.S. PATENT DOCUMENTS

| | | | |
|---|---|---|---|
| 5,761,715 A * | 6/1998 | Takahashi | 711/128 |
| 5,845,309 A | 12/1998 | Shirotori | |
| 5,875,464 A * | 2/1999 | Kirk | 711/129 |
| 6,038,647 A | 3/2000 | Shimizu | |
| 6,351,788 B1 | 2/2002 | Yamazaki et al. | |
| 6,560,679 B2 * | 5/2003 | Choi et al. | 711/138 |
| 6,823,426 B2 * | 11/2004 | Goldschmidt et al. | 711/134 |

(Continued)

FOREIGN PATENT DOCUMENTS

EP    0 927 937    7/1999

(Continued)

OTHER PUBLICATIONS

European Search Report dated Dec. 4, 2008.

(Continued)

*Primary Examiner*—Hetul Patel
(74) *Attorney, Agent, or Firm*—Dickinson Wright PLLC

(57) ABSTRACT

An object of the present invention is to reduce power consumption accompanying a cache hit/miss determination. To achieve this object, when accessing a cache memory provided with a means for setting whether a cache refill to each way in the cache memory is allowed for each CPU or each thread, first, a first cache hit/miss determination is performed only on the way for which a refill is set to be allowed (Steps 2-1 and 2-2), and if the first cache hit/miss determination results in a cache hit, the access is ended (Step 2-6). In the case of a cache miss, the way for which a refill is not set to be allowed is accessed (Step 2-3), or a second hit/miss determination is performed by accessing all the ways (Step 2-4).

4 Claims, 7 Drawing Sheets

U.S. PATENT DOCUMENTS 7,055,004 B2 * 5/2006 DeMent et al. ............. 711/136
2007/0250667 A1 * 10/2007 Dement et al. ............. 711/136

FOREIGN PATENT DOCUMENTS

| JP | 9160828 | 6/1997 |
| JP | 1139216 | 2/1999 |
| JP | 200099399 | 4/2000 |
| JP | 2002342163 | 11/2002 |
| WO | 9819242 | 5/1998 |

OTHER PUBLICATIONS

PCT International Search Report dated May 16, 2006.

* cited by examiner

CACHE MEMORY CONTROL METHOD AND CACHE MEMORY CONTROL DEVICE

FIELD OF THE INVENTION

The present invention relates to a cache memory control method and a cache memory control device for a microprocessor provided with a cache memory.

BACKGROUND ART

A microprocessor is provided with a cache memory in order to hide an execution penalty for an access to an external memory. Furthermore, in a recent system provided with a microprocessor, in order to improve program execution performance, a multiprocessor system provided with a plurality of processor cores, and/or a processor capable of multithread processing for efficiently executing a plurality of programs with one processor are/is now being employed.

In a multiprocessor and/or a multithreading processor, a memory for executing a plurality of programs is often used by sharing a single memory space. Also in the case of the above-mentioned cache memory, a cache memory is not provided individually for each processor and/or each thread, but a single cache memory or cache memory system is often put to shared use.

Normally, a cache memory has a set associative configuration with a plurality of ways. When a program accesses a cache memory, whether an access address causes a cache hit or a cache miss is determined normally by accessing all the ways.

In a multiprocessor and/or a processor for performing multithread processing, there exists a method for allocating cache ways so as not to allow data cached by respective programs to affect the mutual programs. In this case, if a cache miss occurs, a way allocated to each program is refilled with data, and therefore, a way in which a cache hit occurs for each program has a high probability of being the allocated way.

Despite this, since a shared cache for caching a shared memory is used, hit/miss determination has to be performed on all the ways, and thus cache hit/miss determination performed by accessing all the ways results in wasteful power consumption state.

In order to reduce power consumption during a cache access, there exists a method for performing cache hit/miss determination only on a way accessed last time, or accessing only a data array for a way accessed last time (e.g., Patent Document 1). However, the effectiveness of this method is limited to the case where an address is sequentially changed such as instruction fetch. Further, in the case of a multiprocessor system and/or a processor for performing multithread processing, instruction fetch addresses and/or data access addresses for a program subjected to parallel processing might not be continuous, which results in insufficient achievement of effects.

Patent Document 1: Japanese Unexamined Patent Publication NO. 11-39216

DESCRIPTION OF THE INVENTION

Problems to be Solved by the Invention

In a shared cache memory accessed by a plurality of processors and/or threads, if the above-described cache memory is the one in which a way to be refilled can be allocated to each processor and/or each thread, the probability of a hit in the allocated way is high, and therefore, hit/miss determination performed simultaneously on all the ways results in wasteful power consumption.

Therefore, an object of the present invention is to provide a cache memory control method and a cache memory control device which are capable of reducing power consumption accompanying cache hit/miss determination.

Means for Solving the Problems

To solve the above-described problems, a cache memory control method of the present invention is intended for a cache memory including at least two memory units, wherein allowance/disallowance of a cache refill is set in advance for each memory unit, the memory unit of the cache memory, for which the cache refill is set to be allowed, is selectively accessed to perform a first cache hit/miss determination, and the access to the cache memory is ended at the time of a cache hit (i.e., by accessing only the memory unit for which the cache refill is set to be allowed).

According to such a method, the first cache hit/miss determination is selectively performed on the memory unit of the cache memory, for which the cache refill is set to be allowed, and the access to the cache memory is ended upon determination of a cache hit (i.e., by accessing only the memory unit for which the cache refill is set to be allowed); thus, it is possible to reduce power consumption accompanying the cache hit/miss determination. In addition, the memory unit, for which the cache refill is set to be allowed, has a high probability of a cache hit, and therefore, the probability of ending the access by accessing only the memory unit, for which the cache refill is set to be allowed, is high, thus making it possible to effectively reduce power consumption.

In the above cache memory control method of the present invention, when the first cache hit/miss determination results in a cache miss, the memory unit of the cache memory, for which the cache refill is disallowed, is preferably selectively accessed to perform a second cache hit/miss determination.

According to such a method, the second cache hit/miss determination is performed on the memory unit for which the cache refill is disallowed; thus, even if a plurality of accesses in which the allowed memory units are different are made to the cache memory, the same address space can be cached.

Further, in the above cache memory control method of the present invention, when the first cache hit/miss determination results in a cache miss, all the memory units in the cache memory may be accessed to perform a second cache hit/miss determination.

According to such a method, the second cache hit/miss determination is performed on all the memory units; thus, even if a plurality of accesses in which the allowed memory units are different are made to the cache memory, the same address space can be cached.

Furthermore, in the above cache memory control method of the present invention, the cache memory is accessed from at least two access sources, and allowance/disallowance of a cache refill is set in advance for each memory unit in association with each of the at least two access sources.

A cache memory control device of the prevent invention includes: a cache memory including at least two memory units; a cache refill allowance/disallowance setting section for setting allowance/disallowance of a cache refill for each memory unit of the cache memory; memory unit selecting means for enabling a selective access to the memory unit of the cache memory, for which the cache refill is set to be allowed by the cache refill allowance/disallowance setting section in accordance with a setting state of the cache refill allowance/disallowance setting section; and a hit/miss control section for performing a first cache memory hit/miss determination on the memory unit for which the cache refill is set to be allowed, and for ending the access to the cache memory at the time of a cache hit (i.e., by accessing only the memory unit for which the cache refill is set to be allowed).

In such a configuration, the first cache hit/miss determination is selectively performed on the memory unit of the cache memory, for which the cache refill is set to be allowed, and the access to the cache memory is ended upon determination of a cache hit (i.e., by accessing only the memory unit for which the cache refill is set to be allowed); thus, it is possible to reduce power consumption accompanying the cache hit/miss determination. In addition, the memory unit, for which the cache refill is set to be allowed, has a high probability of a cache hit, and therefore, the probability of ending the access by accessing only the memory unit, for which the cache refill is set to be allowed, is high, thus making it possible to effectively reduce power consumption.

In the above cache memory control device of the present invention, when a cache miss is determined by the hit/miss control section, the memory unit selecting means preferably enables a selective access to the memory unit of the cache memory, for which the cache refill is disallowed, and the hit/miss control section preferably performs a second cache hit/miss determination on the memory unit for which the cache refill is disallowed.

In such a configuration, the second cache hit/miss determination is performed on the memory unit for which the cache refill is disallowed; thus, even if a plurality of accesses in which the allowed memory units are different are made to the cache memory, the same address space can be cached.

Further, in the above cache memory control device of the present invention, when a cache miss is determined by the hit/miss control section, the memory unit selecting means may enable an access to all the memory units in the cache memory, and the hit/miss control section may perform a second cache hit/miss determination on all the memory units in the cache memory.

In such a configuration, the second cache hit/miss determination is performed on all the memory units; thus, even if a plurality of accesses in which the allowed memory units are different are made to the cache memory, the same address space can be cached.

Furthermore, in the above cache memory control device of the present invention, the cache memory is accessed from at least two access sources, and the cache refill allowance/disallowance setting section sets allowance/disallowance of a cache refill in advance for each memory unit in association with each of the at least two access sources.

Moreover, the cache refill allowance/disallowance setting section preferably has a register for setting allowance/disallowance of a cache refill for each memory unit, and a value in the register is preferably changeable by means of a software.

Effects of the Invention

In a system that is provided with a multiprocessor and/or a CPU (Central Processing Unit) for performing multithread processing and equipped with a shared cache memory, if a way to be refilled can be allocated to each processor or thread by a cache memory control section, the utilization of the present invention enables power reduction of a cache access without degrading the performance of a cache access cycle.

Figure 1:
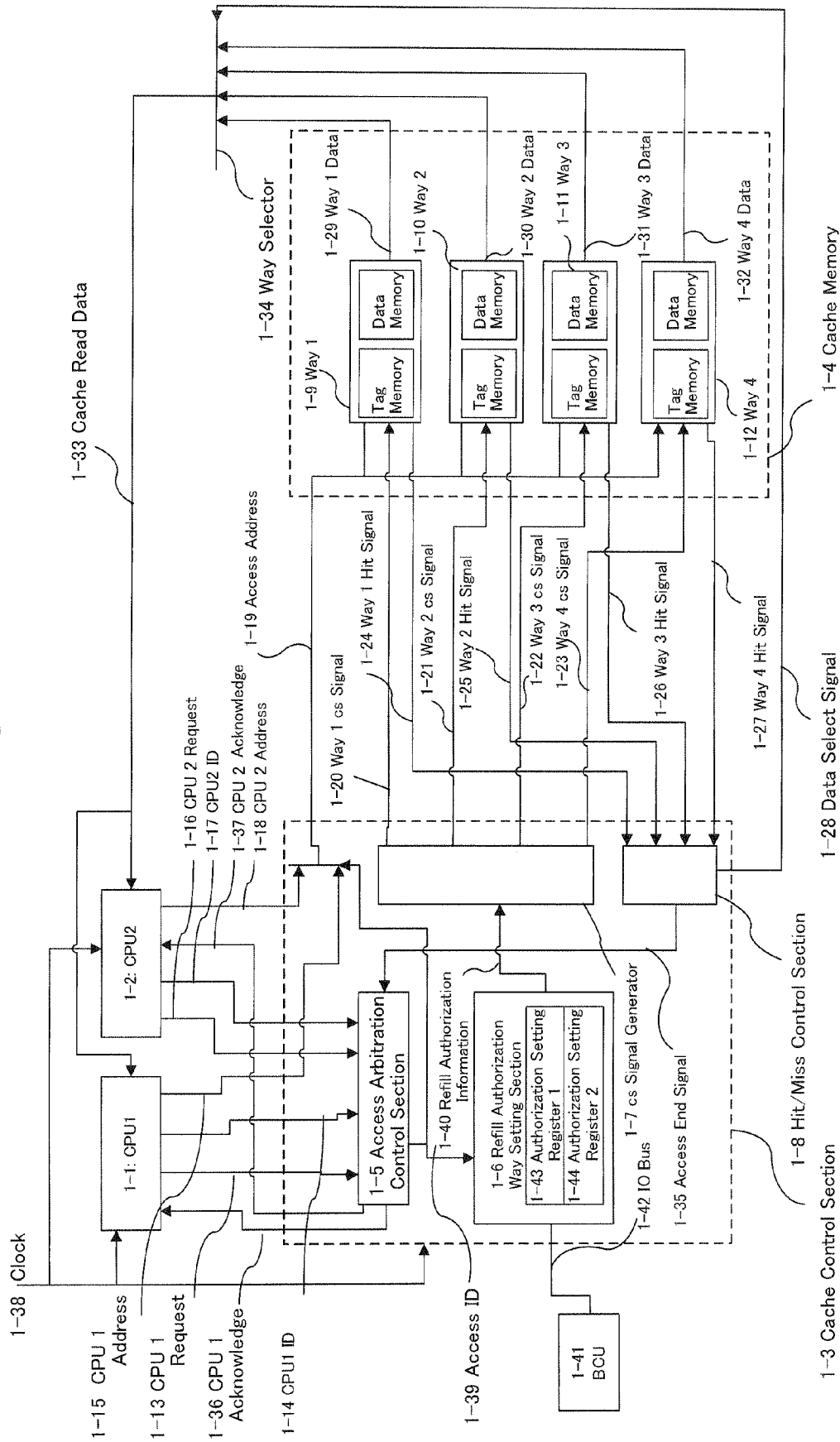
FIG. 1 illustrates a block diagram showing a system configuration of a cache memory control device in Embodiment 1 of the present invention.

DESCRIPTION OF THE REFERENCE NUMERALS (1-1) CPU 1
(1-2) CPU 2
(1-3) cache control section
(1-4) cache memory
(1-5) access arbitration control section
(1-6) refill authorization way setting section
(1-7) CS signal generator
(1-8) hit/miss control section
(1-9) way 1
(1-10) way 2
(1-11) way 3
(1-12) way 4
(1-13) CPU 1 request
(1-14) CPU 1 ID
(1-15) CPU 1 address
(1-16) CPU 2 request
(1-17) CPU 2 ID
(1-18) CPU 2 address
(1-19) access address
(1-20) way 1 CS signal
(1-21) way 2 CS signal
(1-22) way 3 CS signal
(1-23) way 4 CS signal
(1-24) way 1 hit signal
(1-25) way 2 hit signal
(1-26) way 3 hit signal
(1-27) way 4 hit signal
(1-28) data select signal
(1-29) way 1 data
(1-30) way 2 data
(1-31) way 3 data
(1-32) way 4 data
(1-33) cache read data
(1-34) way selector
(1-35) access end signal
(1-36) CPU 1 acknowledge
(1-37) CPU 2 acknowledge
(1-38) clock
(1-39) access ID
(1-40) refill authorization information (1-41) BCU
(1-42) IO bus
(1-43) authorization setting register 1
(1-44) authorization setting register 2
2-1 first access step
2-2 first hit/miss determination step
2-3 second access step
2-4 second hit/miss determination step
2-5 cache refill step
2-6 data output step
2-7 access end step

BEST MODE FOR CARRYING-OUT OF THE INVENTION

Hereinafter, embodiments of the present invention will be described with reference to the drawings.

Embodiment 1

FIG. 1 illustrates a system configuration diagram of a cache memory control device in Embodiment 1. In FIG. 1, functional parts required for a cache hit operation at the time of a read access are shown. This system is operated by allowing a CPU 1 (1-1) and a CPU 2 (1-2) to share a cache memory (1-4) via a cache control section (1-3).

In the cache control section (1-3), the reference numeral (1-5) denotes an access arbitration control section, the reference numeral (1-6) denotes a refill authorization way setting section, the reference numeral (1-7) denotes a CS (Chip Select) signal generator, and the reference numeral (1-8) denotes a hit/miss control section. The reference numeral (1-43) denotes an authorization setting register 1, and the reference numeral (1-44) denotes an authorization setting register 2. The reference numeral (1-41) denotes a BCU (Bus Control Unit) functioning as a bus control section, and the reference numeral (1-42) denotes an IO (Input/Output) bus. In the cache memory (1-4), the reference numeral (1-9) denotes a way 1, the reference numeral (1-10) denotes a way 2, the reference numeral (1-11) denotes a way 3, and the reference numeral (1-12) denotes a way 4.

The reference numeral (1-13) denotes a CPU 1 request, the reference numeral (1-14) denotes a CPU 1 ID, and the reference numeral (1-15) denotes a CPU 1 address. The reference numeral (1-16) denotes a CPU 2 request, the reference numeral (1-17) denotes a CPU 2 ID, and the reference numeral (1-18) denotes a CPU 2 address. The reference numeral (1-19) denotes an access address provided by the cache control section (1-3).

The reference numeral (1-20) denotes a way 1 CS signal, the reference numeral (1-21) denotes a way 2 CS signal, the reference numeral (1-22) denotes a way 3 CS signal, and the reference numeral (1-23) denotes a way 4 CS signal. The CS signals for the respective ways, i.e., the respective signals denoted by the reference numerals (1-20) through (1-23), are negative logic signals. The reference numeral (1-24) denotes a way 1 hit signal, the reference numeral (1-25) denotes a way 2 hit signal, the reference numeral (1-26) denotes a way 3 hit signal, and the reference numeral (1-27) denotes a way 4 hit signal. The reference numeral (1-28) denotes a data select signal. The reference numeral (1-29) denotes way 1 data, the reference numeral (1-30) denotes way 2 data, the reference numeral (1-31) denotes way 3 data, and the reference numeral (1-32) denotes way 4 data. The reference numeral (1-33) denotes cache read data. The reference numeral (1-34) denotes a way selector. The reference numeral (1-35) denotes an access end signal. The reference numeral (1-36) denotes a CPU 1 acknowledge, and the reference numeral (1-37) denotes a CPU 2 acknowledge. The reference numeral (1-38) denotes a clock. The reference numeral (1-39) denotes an access ID. The reference numeral (1-40) denotes refill authorization information.

Hereinafter, the cache memory control device of the present embodiment will be described in detail. If a memory access is performed from the CPU 1 (1-1) and CPU 2 (1-2), the access arbitration control section (1-5) of the cache control section (1-3) arbitrates which CPU performs the access, and the access ID (1-39) used for performing a cache access is generated from the ID of the CPU that has accepted the process. In this embodiment, the ID of the CPU, which has accepted the process, becomes the access ID (1-39) as it is.

Based on the access ID (1-39), the cache control section (1-3) selects, for example, the CPU 1 address (1-15) and sends it to the cache memory (1-4).

The cache control section (1-3) has the refill authorization way setting section (1-6) that includes the authorization setting register 1 (1-43) and the authorization setting register 2 (1-44) for setting which way is authorized to be refilled by a program being executed at the CPU 1 (1-1) and CPU 2 (1-2). The authorization setting register 1 (1-43) stores the settings for the CPU 1 (1-1), and the authorization setting register 2 stores the setting for the CPU 2 (1-2). Furthermore, the authorization setting register 1 (1-43) and the authorization setting register 2 (1-44) are registers that can be accessed from the BCU (1-41) via the IO bus (1-42), and can be freely set by means of a software.

The cache memory (1-4) has a set associative configuration. In this diagram, the cache memory (1-4) having a four-way set associative configuration is shown. More specifically, the cache memory (1-4) includes the following four memory blocks (memory units): the way 1 (1-9); the way 2 (1-10); the way 3 (1-11); and the way 4 (1-12). Each of the ways includes a tag memory in which tag data is stored, and a data memory in which data is stored.

An access to each of the ways is executed upon input of a CS signal from the CS signal generator (1-7). The CS signal generator (1-7) generates the way 1 CS signal (1-20) and inputs it to the way 1 (1-9). The way 1 (1-9), to which the CS signal has been inputted, performs cache hit/miss determination on the access address (1-19), which is the CPU 1 address (1-15) in this example, and outputs the way 1 hit signal (1-24) to the hit/miss control section (1-8). In the case of a cache hit, the way 1 data (1-29) is outputted from the data memory in the way 1. The other ways operate similarly.

The hit/miss control section (1-8) receives the way 1 hit signal (1-24), the way 2 hit signal (1-25), the way 3 hit signal (1-26) and the way 4 hit signal (1-27), and if any one of the hit signals is asserted, the hit/miss control section (1-8) determines a cache hit and outputs the data select signal (1-28). Furthermore, simultaneously with the output of the data select signal (1-28), the hit/miss control section (1-8) outputs the access end signal (1-35) to inform the access arbitration control section (1-5) of the access end, and the access arbitration control section (1-5) outputs the CPU 1 acknowledge (1-36) or the CPU 2 acknowledge (1-37) based on the currently accessed access ID (1-39).

The way selector (1-34) receives the data select signal (1-28) outputted as described above, selects the data of the hit way, and outputs the cache read data (1-33) to the CPU 1 (1-1) and CPU 2 (1-2).

Figure 2:
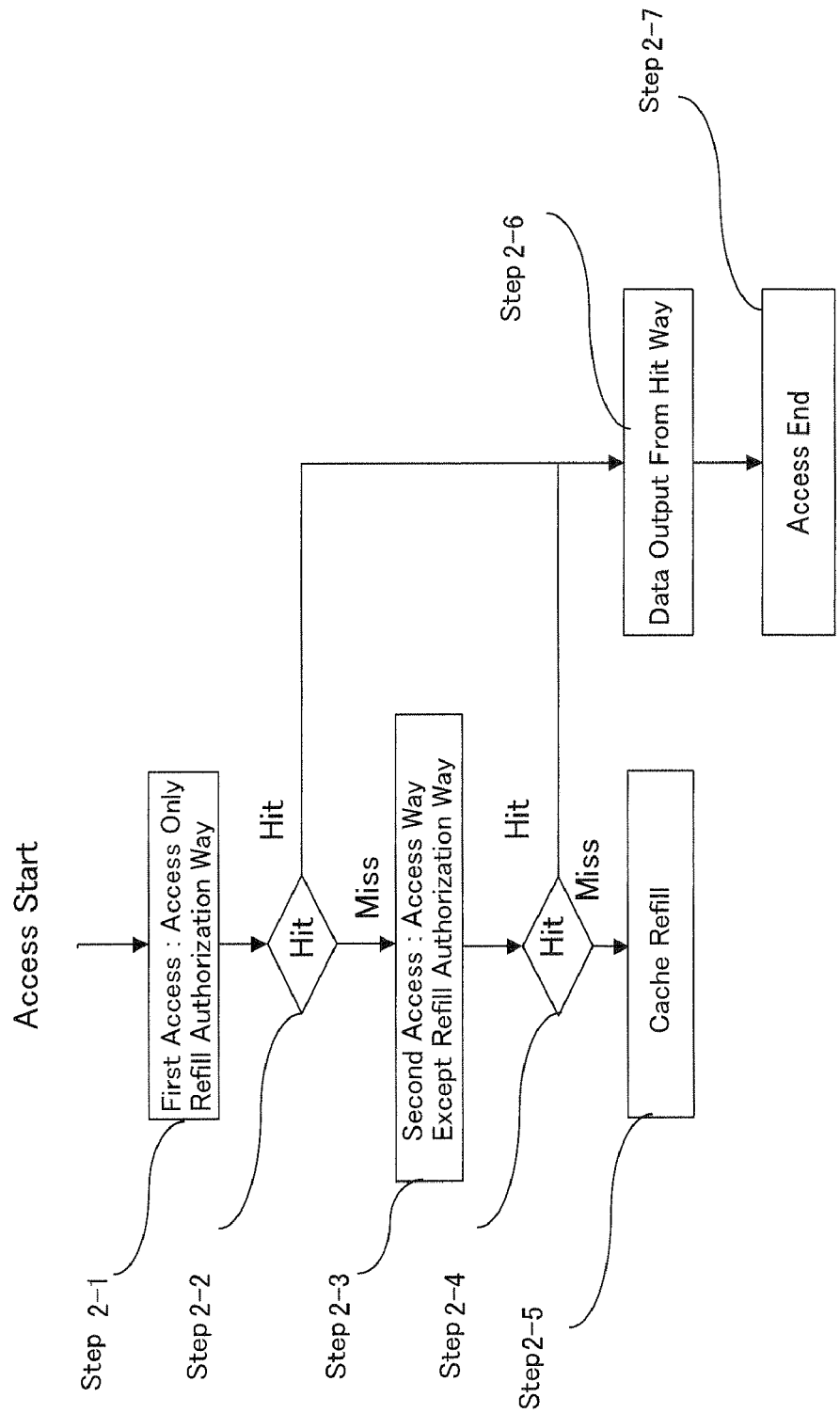
FIG. 2 illustrates a flow chart of a cache access in Embodiment 1 of the present invention.

FIG. 2 illustrates a flow chart of the cache access in Embodiment 1 of the present invention. When an access is made from the CPU 1 (1-1) or the CPU 2 (1-2), the access arbitration control section (1-5) determines the CPU, the access of which is to be accepted, generates the access ID (1-39), and starts the cache access.

Upon start of the cache access, the refill authorization information (1-40) is outputted based on the access ID (1-39) from the refill authorization way setting section (1-6) to the CS signal generator (1-7). If the CPU 1 (1-1) has been accepted, the content of the authorization setting register 1 (1-43) is outputted as the refill authorization information (1-40), and if the CPU 2 (1-2) has been accepted, the content of the authorization setting register 2 (1-44) is outputted as the refill authorization information (1-40). As a result, the CS signal generator (1-7) generates a CS signal only for the allocated way, and thus the allocated way is accessed (Step 2-1).

The accessed way performs hit/miss determination and returns a hit signal, resulting from the hit/miss determination, to the hit/miss control section (1-8). At the hit/miss control section (1-8), a first hit/miss determination is performed (Step 2-2).

If the hit signal is asserted by any one of the ways, the hit/miss control section (1-8) determines that a hit has occurred, outputs the data of the hit way (Step 2-6), and then ends the access (Step 2-7).

If it is determined by the hit/miss control section (1-8) that a miss has occurred in Step 2-2, the CS signal generator (1-7) generates a CS signal for the other way that is not allocated at the authorization setting register 1 (1-43) in the refill authorization way setting section (1-6), and performs a second access (Step 2-3).

The way, on which the second access has been performed, returns a hit signal resulting from hit/miss determination to the hit/miss control section (1-8). At the hit/miss control section (1-8), a second hit/miss determination is performed (Step 2-4). If the hit signal is asserted by any one of the ways, it is determined that a hit has occurred, the data of the hit way is outputted (Step 2-6), and then the access is ended (Step 2-7).

If the second hit/miss determination (Step 2-4) results in a miss, a refill process from an external memory starts (Step 2-5).

Figure 3:
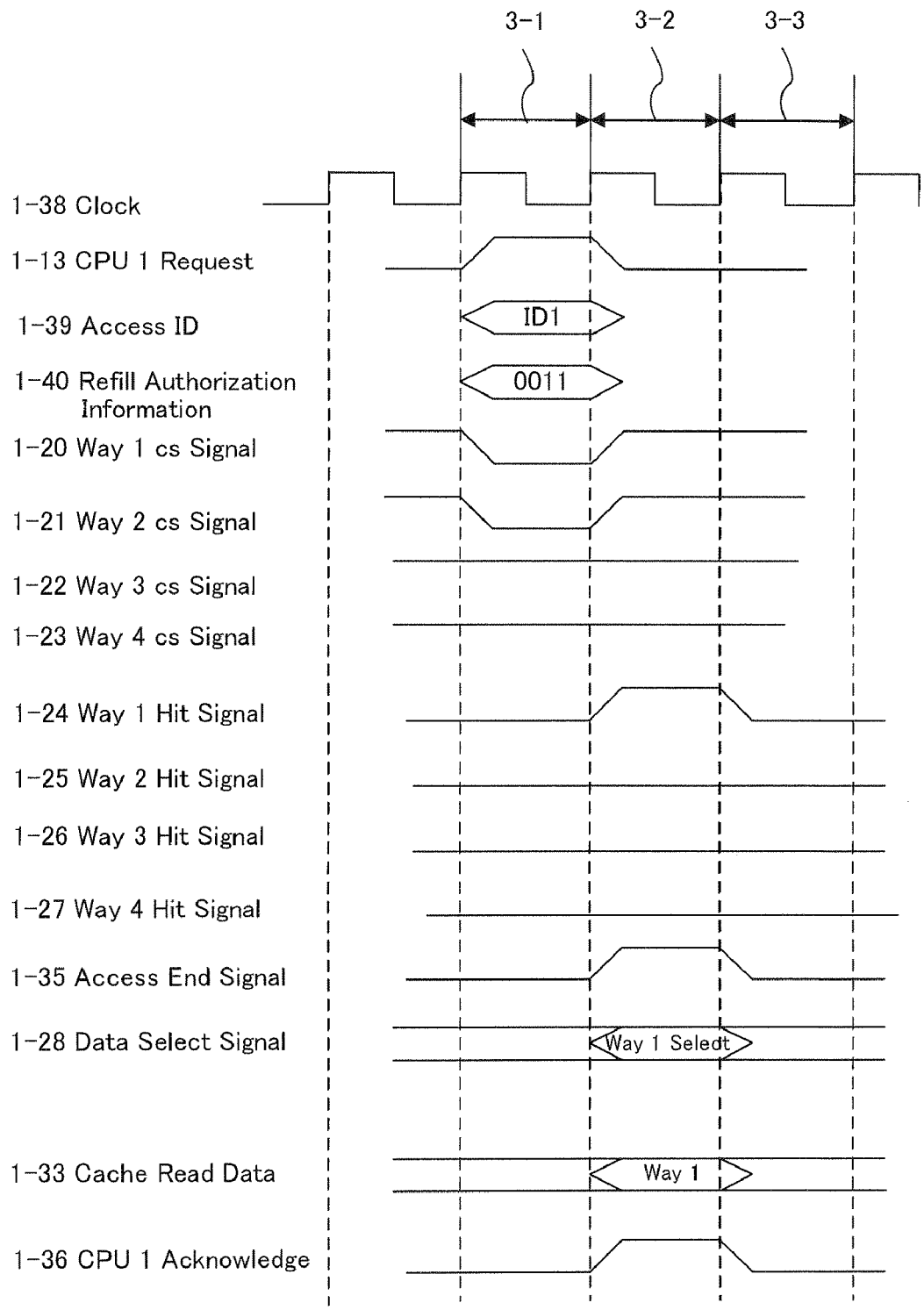
FIG. 3 illustrates a timing diagram (a hit in an allocated way) of the cache memory control device in Embodiment 1 of the present invention.

FIG. 3 illustrates a timing diagram in Embodiment 1 when a hit occurs in the allocated way. This diagram illustrates the case where an access is made from the CPU 1 (1-1).

Further, with respect to the CPU 1 (1-1), refill authorization for the way 1 and the way 2 is set in the refill authorization way setting section (1-6).

In Cycle 3-1, a cache request is issued from the CPU 1 (1-1), and the access arbitration control section (1-5) accepts an access from the CPU 1 (1-1) and generates the access ID (1-39). That is to say, as the access ID (1-39), "ID 1" indicative of the CPU 1 (1-1) is outputted.

Based on the access ID (1-39), the refill authorization way setting section (1-6) outputs "0011" as the refill authorization information (1-40) to the CS signal generator (1-7). This diagram shows that each bit of the refill authorization information (1-40) is associated with each way, and "1" indicates authorization.

The CS signal generator (1-7) generates a CS signal only for the way 1 and the way 2, and asserts the way 1 CS signal (1-20) and the way 2 CS signal (1-21) but does not assert the way 3 CS signal (1-22) and the way 4 CS signal (1-23).

The way 1 (1-9) and the way 2 (1-10), to which the CS signals have been inputted, perform hit/miss determination on the access address (1-19), and output the way 1 hit signal (1-24) and the way 2 hit signal (1-25), respectively, in Cycle 3-2. FIG. 3 illustrates the case where a hit occurs in the way 1.

Upon receipt of the way 1 hit signal (1-24) and the way 2 hit signal (1-25), the hit/miss control section (1-8) determines that a hit has occurred in the way 1, and outputs the access end signal (1-35) to end the cache control. At the same time, as the data select signal (1-28), a signal for selecting the way 1 is outputted.

Based on the access end signal (1-35) and the access ID (1-39), the access arbitration control section (1-5) returns an acknowledge signal to the CPU indicated by the access ID (1-39). Since the access is made from the CPU 1 (1-1) in this diagram, the CPU 1 acknowledge (1-36) is asserted.

Upon receipt of the data select signal (1-28), the way selector (1-34) selects the way 1 data (1-29), and outputs the data of the way 1 as the cache read data (1-33).

In the case where ways for refilling a cache are allocated to respective CPUs and/or respective threads of a multiprocessor and the refilling ways are limited by the respective CPU and/or the respective threads, the way in which a cache access hit occurs has a high probability of being one of the above allocated ways. In particular, if a memory space is divided by the respective CPUs and/or the respective threads and there is no shared memory space even in the same physical memory, the probability is 100%.

In such a case, even if all the ways in the shared cache memory are accessed, the probability of a hit in the allocated way is high, and therefore, the operation of a memory of the way that is not allocated will result in wasteful power consumption.

If only the allocated way is accessed and a hit occurs in this way, it is unnecessary to access the other ways.

Furthermore, in the method of the present invention, if a hit occurs in the allocated way, the number of cycles until the access end is the same as in the case where all the ways are accessed in the first access.

According to the present invention, in consideration of the above-described probability of a hit in the allocated way, it is possible to realize power reduction without causing performance degradation.

Figure 4:
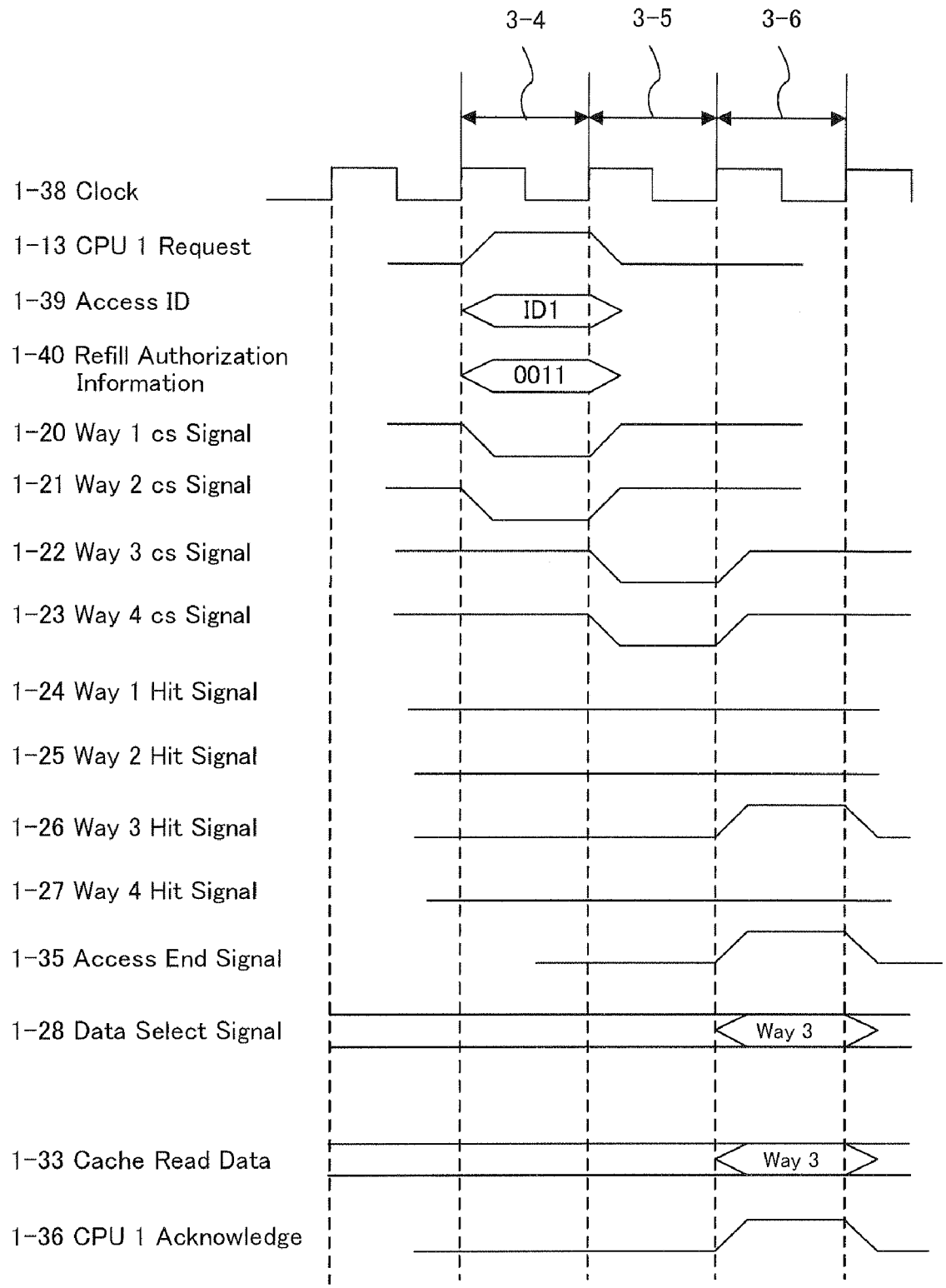
FIG. 4 illustrates a timing diagram (a hit in a way other than the allocated way) of the cache memory control device in Embodiment 1 of the present invention.

FIG. 4 illustrates a timing diagram in Embodiment 1 when a hit occurs in the way other than the allocated way. FIG. 4 shows the operation in the case where a hit occurs in the way 3. The operation of Cycle 3-4 is similar to that of Cycle 3-1 in FIG. 3.

In Cycle 3-5, since a hit does not occur in the way 1 and the way 2 which have been accessed, the way 1 hit signal (1-24) and the way 2 hit signal (1-25) are not asserted. The cache control section (1-3) determines that a hit has not occurred in the first hit/miss determination, and starts the second hit/miss determination.

In Cycle 3-5, in order to access the way 3 and the way 4 which have not been allocated, the way 3 CS signal (1-22) and the way 4 CS signal (1-23) are generated from the CS signal generator (1-7).

In Cycle 3-6, the way 3 hit signal (1-26) and the way 4 hit signal (1-27) are outputted.

The hit/miss control section (1-8) performs a second determination cycle in which it is determined that a hit has occurred in the way 3 based on the way 3 hit signal (1-26), and ends the cache control, thus outputting the access end signal (1-35). At the same time, a signal for selecting the way 3 is outputted as the data select signal (1-28).

Upon receipt of the data select signal (1-28), the way selector (1-34) selects the way 3 data (1-31), and outputs the data of the way 3 as the cache read data (1-33).

It should be noted that, although not shown, if both of the way 3 hit signal (1-26) and the way 4 hit signal (1-27) are not asserted in Cycle 3-6 in FIG. 3, the hit/miss control section (1-8) determines that a cache miss has occurred, and the cache control section (1-3) starts a refill process from an external memory in the cycle subsequent to Cycle 3-6.

By performing the above-described two-stage access, even if there exists data, which hits in the way other than the way allocated to the present CPU by the CPU other than the present CPU in the shared memory space, the data read from the cache is enabled.

Moreover, there is no need to access an external memory by the cache access, and it is possible to use the shared cache memory similarly to the case where all the ways are accessed.

Furthermore, the way in which a cache hit occurs has a high probability of being the allocated way as described above; therefore, in view of the overall program execution, it is possible to realize power reduction with the access performance similar to the case where all the ways are accessed.

It should be noted that although a read access has been described in the present embodiment, the power reduction can also be realized by the similar method in a write access.

Further, although the present embodiment has been described on the supposition that a cache memory in which each way of the cache memory performs hit/miss determination upon input of a CS signal and provides data output, it is also possible to execute the similar process in a cache memory in which a tag memory and a data memory in the cache memory can be respectively accessed by means of a CS signal for a tag memory and a CS signal for a data memory.

Embodiment 2

Figure 5:
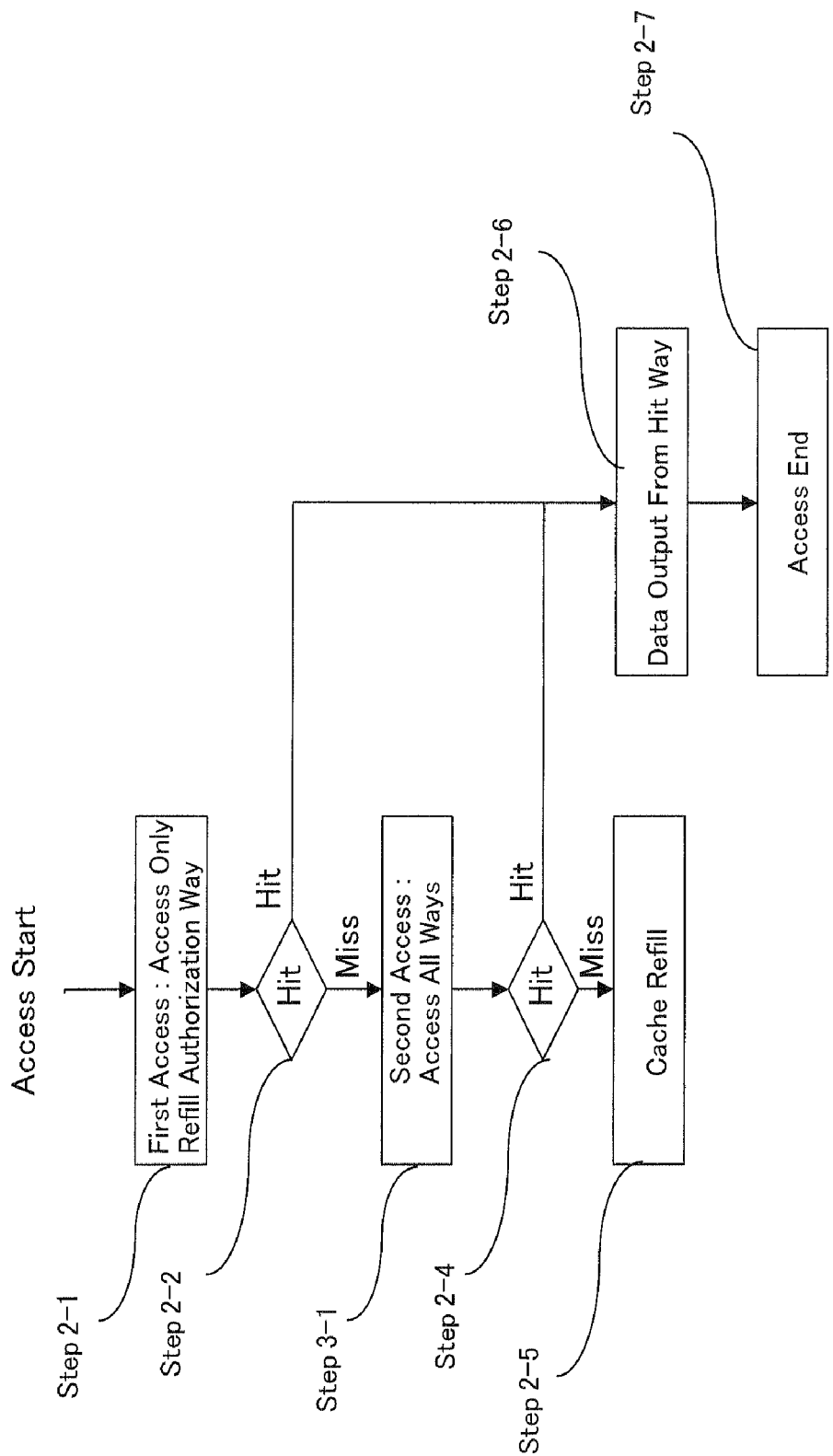
FIG. 5 illustrates a flow chart of a cache access in Embodiment 2 of the present invention.

FIG. 5 illustrates a flow chart of a cache access in Embodiment 2 of the present invention.

In Embodiment 2, only the number of the ways accessed during a second access differs from that in Embodiment 1, and the steps from the access start to a first access (i.e., Steps 2-1 and 2-2) and the steps subsequent to the second access (i.e., Steps 2-4, 2-5, 2-6 and 2-7) are similar to those in Embodiment 1.

In Embodiment 2, all the ways are accessed in the second access (Step 3-1).

Figure 6:
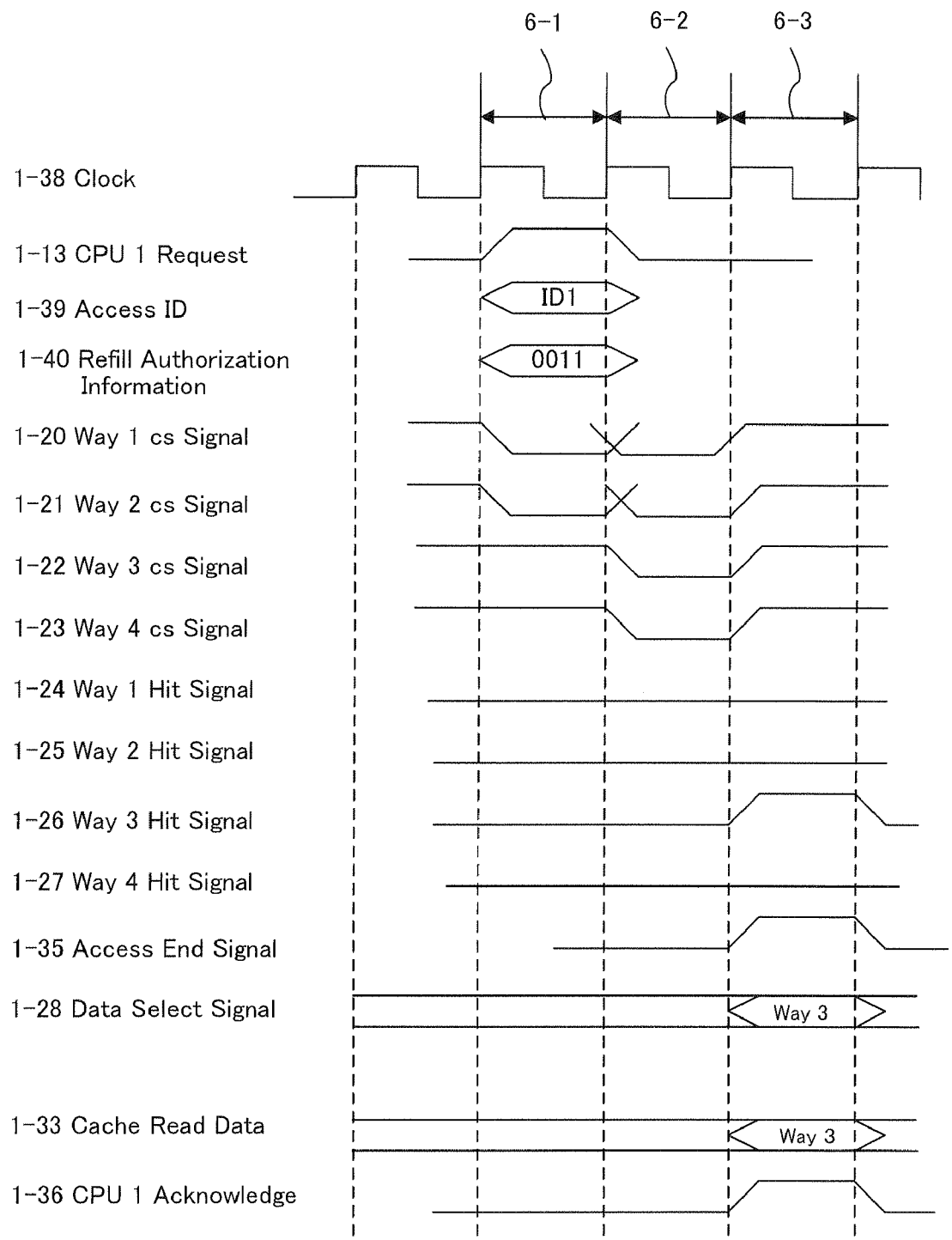
FIG. 6 illustrates a timing diagram of a cache memory control device in Embodiment 2 of the present invention.

FIG. 6 illustrates a timing diagram in Embodiment 2. The diagram shows the timing in the case where a hit has occurred in the way that is not allocated.

It should be noted that if a hit occurs in the allocated way, the access timing is exactly similar to that in Embodiment 1 (FIG. 3).

The operation of Cycle 6-1 is similar to that of Cycle 3-1 in FIG. 3.

In Cycle 6-1, since a hit does not occur in the way 1 and the way 2 which have been accessed, the way 1 hit signal (1-24) and the way 2 hit signal (1-25) are not asserted. The cache control section (1-3) determines that a hit has not occurred in a first hit/miss determination, and starts a second hit/miss determination.

In Cycle 6-2, all the ways are accessed. The CS signal generator (1-7) generates the way 1 CS signal (1-20), the way 2 CS signal (1-21), the way 3 CS signal (1-22) and the way 4 CS signal (1-23).

In Cycle 6-3, the way 1 hit signal (1-24), the way 2 hit signal (1-25), the way 3 hit signal (1-26) and the way 4 hit signal (1-27) are outputted.

The hit/miss control section (1-8) performs the second hit/miss determination to determine that a hit has occurred in the way 3 based on the way 3 hit signal (1-26), and ends the cache control, thus outputting the access end signal (1-35). At the same time, a signal for selecting the way 3 is outputted as the data select signal (1-28).

Upon receipt of the data select signal (1-28), the way selector (1-34) selects the way 3 data (1-31), and outputs the data of the way 3 as the cache read data (1-33).

It should be noted that, similarly to Embodiment 1, only a read access has been described in Embodiment 2, whereas the similar method is also applicable to a write access.

Embodiment 3

Figure 7:
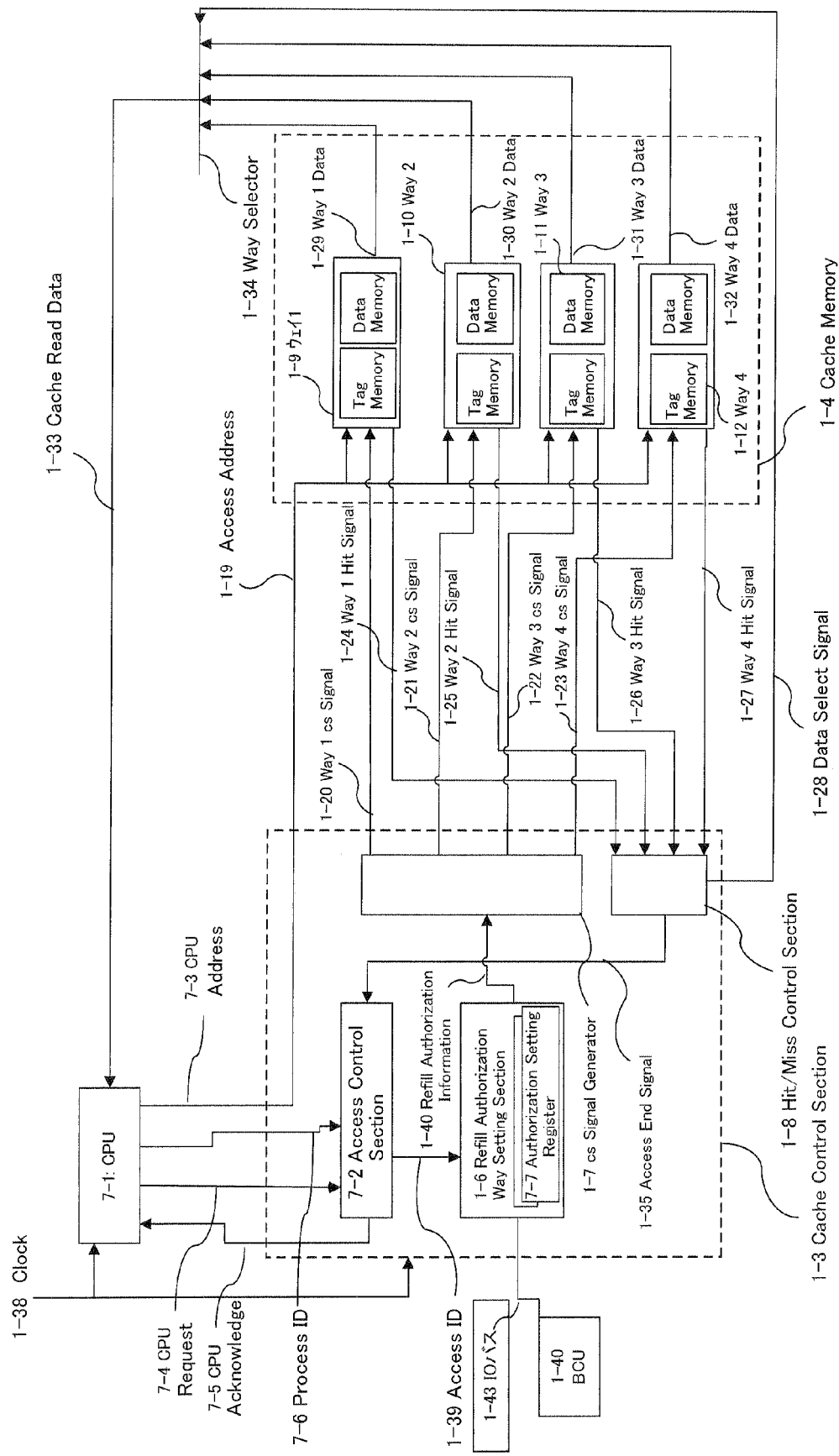
FIG. 7 illustrates a block diagram showing a system configuration of a cache memory control device in Embodiment 3 of the present invention.

FIG. 7 illustrates a system configuration diagram of a cache memory control device in Embodiment 3. In FIG. 7, functional parts required for a cache hit operation at the time of a read access are shown.

A CPU (7-1) in this system is a CPU that executes a plurality of programs while switching information on internal resource such as a program counter by the hour, or a CPU that performs parallel execution of a plurality of programs by one CPU (multithread). Herein, the CPU (7-1) of the present embodiment is a CPU that performs a normal multithread operation and does not allow a thread to be switched during execution of a memory access.

The reference numeral (7-2) denotes an access control section, the reference numeral (7-3) denotes a CPU address, the reference numeral (7-4) denotes a CPU request, the reference numeral (7-5) denotes a CPU acknowledge, and the reference numeral (7-6) denotes a process ID. The reference numeral (7-7) denotes an authorization setting register for storing the setting of a refill authorization way for each process ID.

If an access is performed from the CPU 1 (7-1), the CPU request (7-4) is outputted, and in synchronization with this, the process ID (7-6), which is an identifier for the currently executed process, is outputted. Upon receipt of the CPU request (7-4), the access control section (7-2) starts a cache access. Furthermore, the access ID (1-39) is outputted to the refill authorization way setting section (1-6). The refill authorization way setting section (1-6) includes the authorization setting register (7-7) capable of setting a refill authorization way for each process ID, and the setting associated with the access ID (1-39) is outputted as the refill authorization information (1-40). In this embodiment, the process ID (7-6) is outputted as the access ID (1-39) as it is; however, different data may be outputted if the data can be associated with the process ID (7-6).

The subsequent processes are the same as in Embodiment 1 and Embodiment 2, and the same effects are obtainable.

As described above, the CPU (7-1) performs a normal multithread operation and does not allow a thread to be switched in the middle of a read access (i.e., before read data is returned). That is to say, until the cache read data (1-33) is inputted to the CPU (7-1), a thread will not be switched. Therefore, the cache read data (1-33) would always be associated with the process ID (7-6) that has initiated the read access. Accordingly, the CPU (7-1) can receive the cache read data (1-33) as it is.

Further, similarly to Embodiment 1, only the functions of a read access have been described, whereas the similar method is also applicable to a write access.

It should be noted that in each of the foregoing embodiments, if the first hit/miss determination results in a cache hit, the access to the cache memory is completed, and if the first hit/miss determination results in a cache miss, the access to the other ways or all the ways in the cache memory is performed to carry out the second hit/miss determination. However, if the first hit/miss determination results in a cache miss, instead of performing the access to the other ways or all the ways in the cache memory, i.e., the second hit/miss determination, a refill process from an external memory may alternatively be started.

INDUSTRIAL APPLICABILITY

A cache memory control device according to the present invention has the effect of enabling power reduction of a cache access while hardly degrading the performance of a cache access cycle, and is useful as a system that is provided with a multiprocessor and/or a CPU for performing multi-thread processing and equipped with a shared cache memory.

The invention claimed is:

1. A cache memory control method which is intended for a cache memory comprising at least two memory units, and in which allowance/disallowance of a cache refill is set in advance for each memory unit, the memory unit of the cache memory, for which the cache refill is set to be allowed, is selectively accessed to perform a first cache hit/miss determination, and the access to the cache memory is ended at the time of a cache hit,
   wherein when the first cache hit/miss determination results in a cache miss, the memory unit of the cache memory, for which the cache refill is disallowed, is selectively accessed to perform a second cache hit/miss determination.

2. A cache memory control method for a cache memory comprising at least two memory units, in which allowance/disallowance of a cache refill is set in advance for each memory unit, the memory unit of the cache memory, for which the cache refill is set to be allowed, is selectively accessed to perform a first cache hit/miss determination, and the access to the cache memory is ended at the time of a cache hit,
   wherein when the first cache hit/miss determination results in a cache miss, all the memory units in the cache memory are accessed to perform a second cache hit/miss determination.

3. A cache memory control device, comprising:
a cache memory comprising at least two memory units;
a cache refill allowance/disallowance setting section for setting allowance/disallowance of a cache refill for each memory unit of the cache memory;
a memory unit selecting section for enabling a selective access to the memory unit of the cache memory, for which the cache refill is set to be allowed by the cache refill allowance/disallowance setting section in accordance with a setting state of the cache refill allowance/disallowance setting section; and
a hit/miss control section for performing a first cache memory hit/miss determination on the memory unit for which the cache refill is set to be allowed, and for ending the access to the cache memory at the time of a cache hit,
wherein when a cache miss is determined by the hit/miss control section, the memory unit selecting section enables a selective access to the memory unit of the cache memory, for which the cache refill is disallowed, and the hit/miss control section performs a second cache hit/miss determination on the memory unit for which the cache refill is disallowed.

4. A cache memory control device, comprising:
a cache memory comprising at least two memory units;
a cache refill allowance/disallowance setting section for setting allowance/disallowance of a cache refill for each memory unit of the cache memory;
a memory unit selecting section for enabling a selective access to the memory unit of the cache memory, for which the cache refill is set to be allowed by the cache refill allowance/disallowance setting section in accordance with a setting state of the cache refill allowance/disallowance setting section; and
a hit/miss control section for performing a first cache memory hit/miss determination on the memory unit for which the cache refill is set to be allowed, and for ending the access to the cache memory at the time of a cache hit,
wherein when a cache miss is determined by the hit/miss control section, the memory unit selecting section enables an access to all the memory units in the cache memory, and the hit/miss control section performs a second cache hit/miss determination on all the memory units in the cache memory.

* * * * *